United States Patent
Sun

(10) Patent No.: US 6,567,751 B1
(45) Date of Patent: May 20, 2003

(54) METHODS AND COMPUTER SYSTEM FOR COMBINATORIAL ANALYSIS OF LIGHTING PHOSPHORS

(75) Inventor: Xiao-Dong Sun, Mountain View, CA (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 09/704,475

(22) Filed: Nov. 3, 2000

(51) Int. Cl.$^7$ ............................................. G06F 19/00
(52) U.S. Cl. ........................... 702/32; 702/22; 702/27; 702/183; 422/50; 422/55; 422/62; 204/192.26; 205/53; 700/266; 700/268
(58) Field of Search .............................. 702/19, 22, 23, 702/25, 27, 32, 33, 185, FOR 115, 116, 117, 118, 119, 134, 170; 422/50, 55, 56, 57, 61, 62, 82.05, 82.07, 82.09, 99; 436/800, 805, 806, 172, 164; 204/450, 471, 483, 192.15, 192.17, 192.26, 192.28; 205/53, 93, 95, 109, 112, 136, 655, 238; 700/90, 91, 266, 268, FOR 103

(56) References Cited

U.S. PATENT DOCUMENTS

| | | |
|---|---|---|
| 5,143,854 A | 9/1992 | Pirrung et al. |
| 5,424,186 A | 6/1995 | Fodor et al. |
| 5,985,356 A | 11/1999 | Schultz et al. |
| 6,093,346 A * | 7/2000 | Xiao et al. ............. 252/301.4 F |
| 6,329,139 B1 * | 12/2001 | Nova et al. .................... 435/6 |
| 6,458,512 B1 * | 10/2002 | Budd et al. .................. 430/311 |

OTHER PUBLICATIONS

"Combinatorial Search for Advanced Luminescence Materials", by Ted X. Sun, John Wiley & Sons, Inc. (1999) pp. 193–201.

* cited by examiner

Primary Examiner—Marc S. Hoff
Assistant Examiner—Elias Desta
(74) Attorney, Agent, or Firm—Jeffrey S. Bernard; Dougherty, Clements & Hofer

(57) ABSTRACT

There is disclosed a method and a computer system enabling high-throughput combinatorial synthesis and screening of lighting phosphors. The system links hardware instrumentation for synthesis and screening. It records, sorts, and analyzes photo-metric data gathered from the combinatorial studies, along with the characteristics of the combinatory processes. The system provides a database as the data storage and query engine, an analysis module as the processor for analytical operations, and an interface for accepting the user's input and displaying the analysis results and other information requested by the user.

10 Claims, 16 Drawing Sheets

METHODS AND COMPUTER SYSTEM FOR COMBINATORIAL ANALYSIS OF LIGHTING PHOSPHORS

BACKGROUND OF THE INVENTION

The present invention relates in general to methods and systems for analyzing selected chemical or physical traits via combinatorial techniques. Specifically, the present invention relates to a computer system and method for recording, organizing, and analyzing selected luminescent properties of lighting phosphors in the combinatorial synthesis and screening of such phosphors.

Combinatorial methodologies have been used in various industries for high-throughput production and screening of desired products with certain physical or chemical traits. A well-known example is combinatorial chemistry methods that have been widely utilized in the pharmaceutical industry for fast synthesizing and screening of chemical compounds and building compound libraries (e.g., U.S. Pat. No. 5,424,186). Another example is a technique for, generating arrays of peptides and other molecules using light-directed, spatially-addressable synthesis (U.S. Pat. No. 5,143,854). More recently, combinatorial methodologies have been applied to inorganic materials in the form of thin films deposited or evaporated onto a substrate (U.S. Pat. No. 5,985,356). In this connection, methods and instruments have been developed to search for new phosphors in a high-throughput fashion (Sun, T., Biotechnology and Bioengineering Combinatorial Chemistry, 61, 4 (1998/1999), using a combination of a thin-film deposition and a masking strategy to generate a thin film spatially addressable library).

Phosphors, i.e., luminescent materials, convert a certain type of energy into electromagnetic radiation over thermal radiation. A phosphor is usually composed of a host lattice doped with fluorescent-active elements (activator) present in up to a few mole %. Phosphors have been widely used in fluorescent lamps, displays, scintillators, etc. Although the search for advanced phosphors started about a century ago, the new photonic technologies, including mercury-free fluorescent lamps, various flat panel displays, computed topography (CT), etc., require new phosphors with advanced properties such as, high quantum efficiency, good absorption of the excitation energy, adequate color coordinates, long lifetime, and low cost.

The discovery of advanced oxide phosphors with multiple superior qualities for display applications continues to be a challenge. The specific spectral properties, absorption, quantum efficiencies, and lumen maintenance depend on complex interactions between the excitation source, host lattice, structural defects, and fluorescent dopants. Luminescence properties are highly sensitive to the changes in dopant composition, host stoichiometry, and processing conditions. Consequently, the identification of phosphors that are ideally suited to the requirements of a given display technology is highly empirical.

Such empiricism demands high processing capacity both for synthesis and for screening of the phosphors. More importantly, the vast amount of data generated from the fast-speed synthesis and screening must be duly sorted, recorded, and analyzed to achieve the overall efficiency of this discovery process. It is impracticable to rely on conventional lab notebooks to track thousand of data entries, let alone to analyze and make sense of them. There is therefore a need for a computer system and method to enable high-throughput combinatory analysis of luminescent properties of phosphors, a need that parallels the need for combinatory chemical compound library systems in the pharmaceutical industry. The latter need has been met with the development of electronic compound libraries that support query and visualization of the chemical structure and other-properties of the compounds. The former need, however, remains unmet. The system and method required must be uniquely designed to analyze photo-metric properties and to seamlessly integrate into the synthesis and screening instrumentation.

BRIEF SUMMARY OF THE INVENTION

There is provided a computer system for combinatorial synthesis, screening, and analysis of luminescent materials, which system comprises: a database having recorded therein information relating to said synthesis, said screening, said analysis, and results of said analysis; an analysis module performing analytic operations to derive said results; and an interface allowing a user to input instructions to said computer system and the computer system to present said information to the user, wherein said database, said analysis module, and said interface are inter-connected. Various alternative configurations of the computer system are provided in the following detailed descriptions.

There is also provided a method for combinatorial synthesis, screening, and analysis of luminescent materials, which method comprises: obtaining a first combinatory library of luminescent materials; digitally recording properties of said luminescent materials in said first combinatory library; and performing computerized analyses based on said properties and the information relating to said combinatorial synthesis and screening.

There is also provided a computer system for combinatorial synthesis, screening, and analysis of luminescent materials, which system comprises: a database means for recording information relating to said synthesis, said screening, said analysis, and results of said analysis; an analysis means for performing analytic operations to derive said results; and an interface means for allowing a user to input instructions to said computer system and the computer system to present said information to the user, wherein said database means, said analysis means, and said interface means are inter-connected.

BRIEF DESCRIPTION OF THE DRAWINGS

The features of the method and system according to the preferred embodiments of the invention will now be described with reference to the drawings summarized below. These drawings and the associated descriptions are provided to illustrate preferred embodiments of the invention, and not to limit the scope of the invention. Throughout the drawings, reference numbers are reused to indicate correspondence between referenced elements. In addition, the first digit of each reference number indicates the figure in which the element first appears.

DETAILED DESCRIPTION OF THE INVENTION

Figure 1:
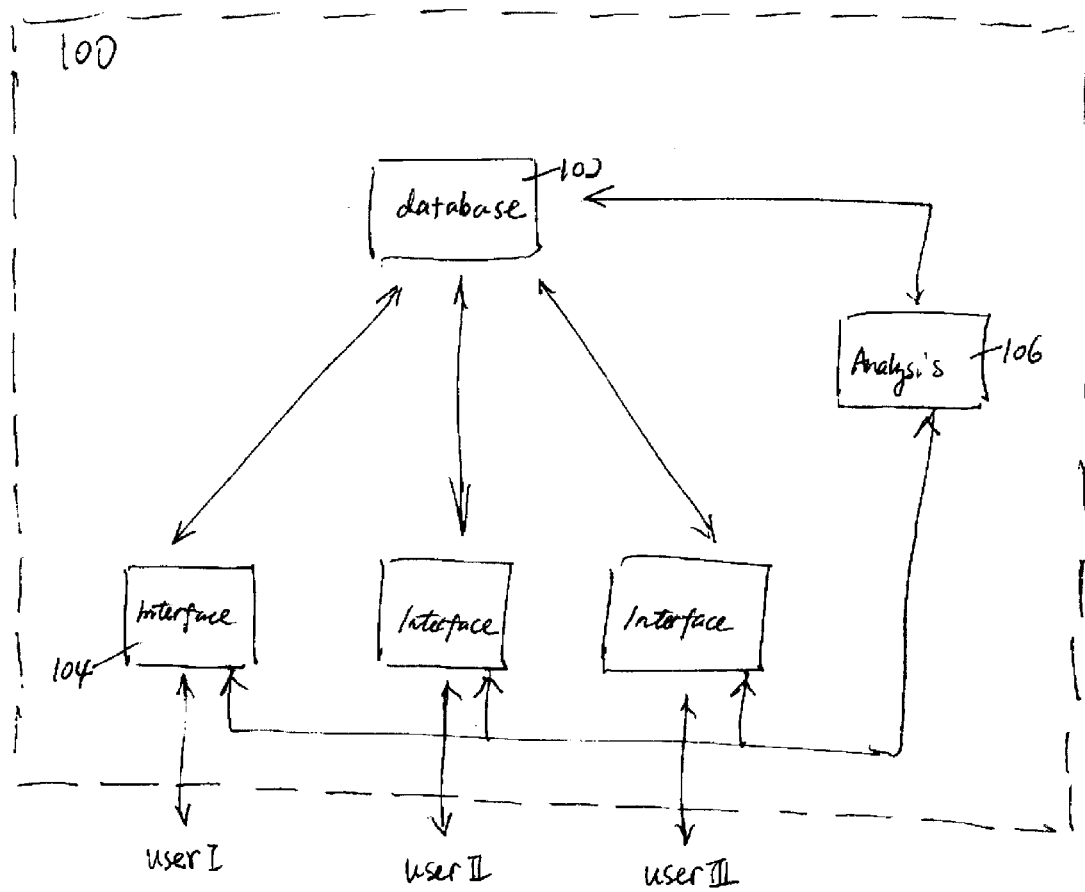
FIG. 1 is an organizational diagram of various components of the computer system 100 according to a preferred embodiment of the invention.

The present inventor has developed a method and a computerized system enabling high-throughput combinatorial synthesis and screening of lighting phosphors. The method and computer system links hardware instrumentation for synthesis and screening. It records, sorts, and analyzes photo-metric data gathered from the combinatorial studies.

According to one aspect of the present invention, the computer system provides a database having stored therein luminescent properties of phosphors, as well as the information on combinatorial synthesis and screening protocols. The data resides in a computer memory, whether standing alone or linked as distributed units. The system allows querying on various photo-metric attributes of the phosphors of interest. It also supports queries on the characteristics of the corresponding processes in the combinatorial experiments, including the steps of synthesis and screening of lighting phosphors.

According to another aspect of the present invention, the computer system provides an interface through which a user monitors combinatorial synthesis and screening and analyzes luminescent property data. A user may design combinatory experiments by entering key parameters via the interface; he may review the results of library synthesis by querying on the relevant parameters. Various types of analyses of the luminescent properties may be performed on the photo-metric data when the user specifies a designated identification number. The interface may support visualization capacities in some embodiments of this invention.

According to yet another aspect of the present invention, the computer system may employ a distributed client-server architecture in some embodiments, where multiple clients with multiple interfaces may serve a plurality of users concurrently. The database module operates on the server and supports the multiple clients via a computer network. In an alternative embodiment, certain clients may have a local mirrored copy of the database for fast access. In this case, distributed databases are synchronized periodically with the master database on the server.

According to a further aspect of the present invention, the computer system provides an analysis module for combinatorial analyses of phosphor luminescent properties. The analysis module is connected directly to the database and the interface; it uses the data from the database, performs analyses according to the user's request received from the interface. Various types of statistical analyses may be included in the system; visualization of the results may also be enabled as needed.

The combinatorial process includes three main elements: combinatorial deposition, parallel synthesis, and high throughput screening.

Hundreds to thousands of different elemental compositions are created on a solid support, in either multiple layer thin film or solution precursor mixing forms. This can be accomplished by either combining thin film deposition apparatus and a masking strategy, or using an automated liquid dispensing system.

Figure 5:
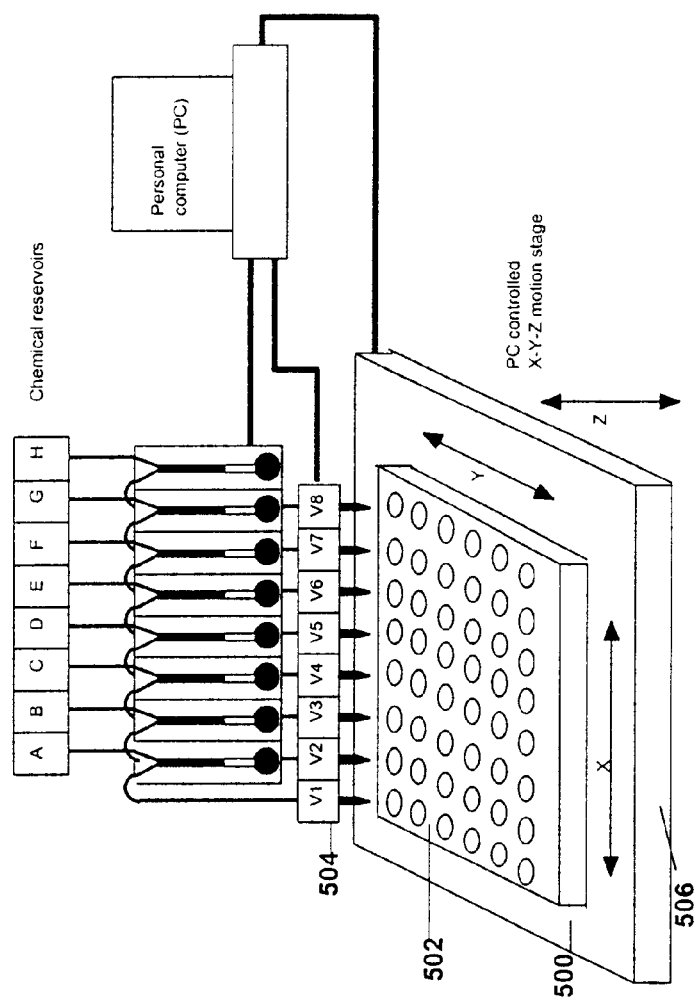
FIG. 5 is a schematic representation of a liquid dispenser, used to generate a phosphors library.

Referring to FIG. 5, for example, a liquid dispensing system is used for generating a powder phosphor library. A sintered alumina (99.5% purity) plate 500 with 128 (8 by 16 array) cells 502 of 2 mm in diameter and about 6 mm in depth is machined and used as containing plate of liquid precursors to powder phosphors. The neighboring cells are 3 mm in center to center separation and registered in position to the array of liquid dispenser 504. By coordinating the scanning motion of a X-Y-Z table 506 mounted with the substrate plate in the spatial resolution of 0.1 mm, and variation of liquid volumes from dispenser, a library with 128 different solution mixing precursors of powder phosphors can be generated in several minutes.

The solid support with the assembly of sample precursors is processed under identical conditions to synthesize a library of solid state materials. Referring to the same example in FIG. 5, high purity ($\geq 99.9\%$) clear aqueous nitrate solutions are used in making the powder library: $Y(NO_3)_3$(1M), $Gd(NO_3)_3$ (1M), $Lu(NO_3)_3$ (1M), $Al(NO_3)_3$ (1M), $Ga(NO_3)_3$ (1M), $Ce(NO_3)_3$ (0.5M). Following a scheme of library design, a solution precursor of the phosphor library is generated on the alumina plate 500 with 128 sample cells. The total amount of samples in each cell is approximately 10 $\mu$mole. The metal compositions of each cell is of the general formula $(Y_xA_{1-x})_3(Al_yGa_{1-y})_5O_{12}:Ce^{3+}_{0.06}$(A: Gd, Lu), where $3 \geq x \geq 0.375, 5 \geq y \geq 0.625$. The identical condition is ensured by placing the library on an orbital shaker for mixing, with an IR lamp shining over to evaporate the solvent; the surface temperature is approximately 80° C. After the samples are dried, the library is placed in a reducing furnace at 1400° C. for 2 hours. The heating and cooling rate is controlled to be about 10° C./minutes.

Figure 6:
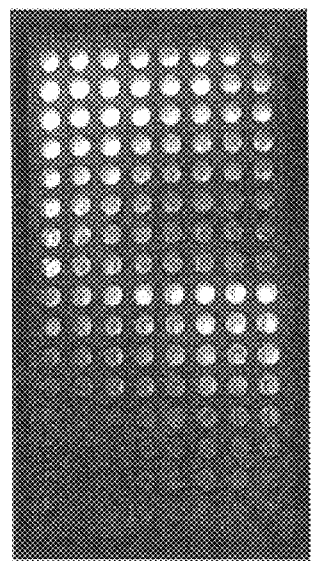
FIG. 6 is a fluorescent image of a powder phosphor library.

Synthesis of the phosphor library is followed by high throughput screening process, which may reach a daily rate of 100–1000 luminescent properties. FIG. 6 shows the fluorescent image of the powder phosphor library generated as discussed above in the example of FIG. 5. After thermal treatment, there is no detectable cross contamination of neighboring samples, and no apparent alumina substrate effect on phosphor samples. The library is placed under a uniform long UV (370 nm) excitation. Three distinguishable emitting colors: orange-yellow-green, may be obtained from this series of phosphors, by simple elemental substitution. The brightest phosphor composition for each color may also be quickly identified.

Figure 3:
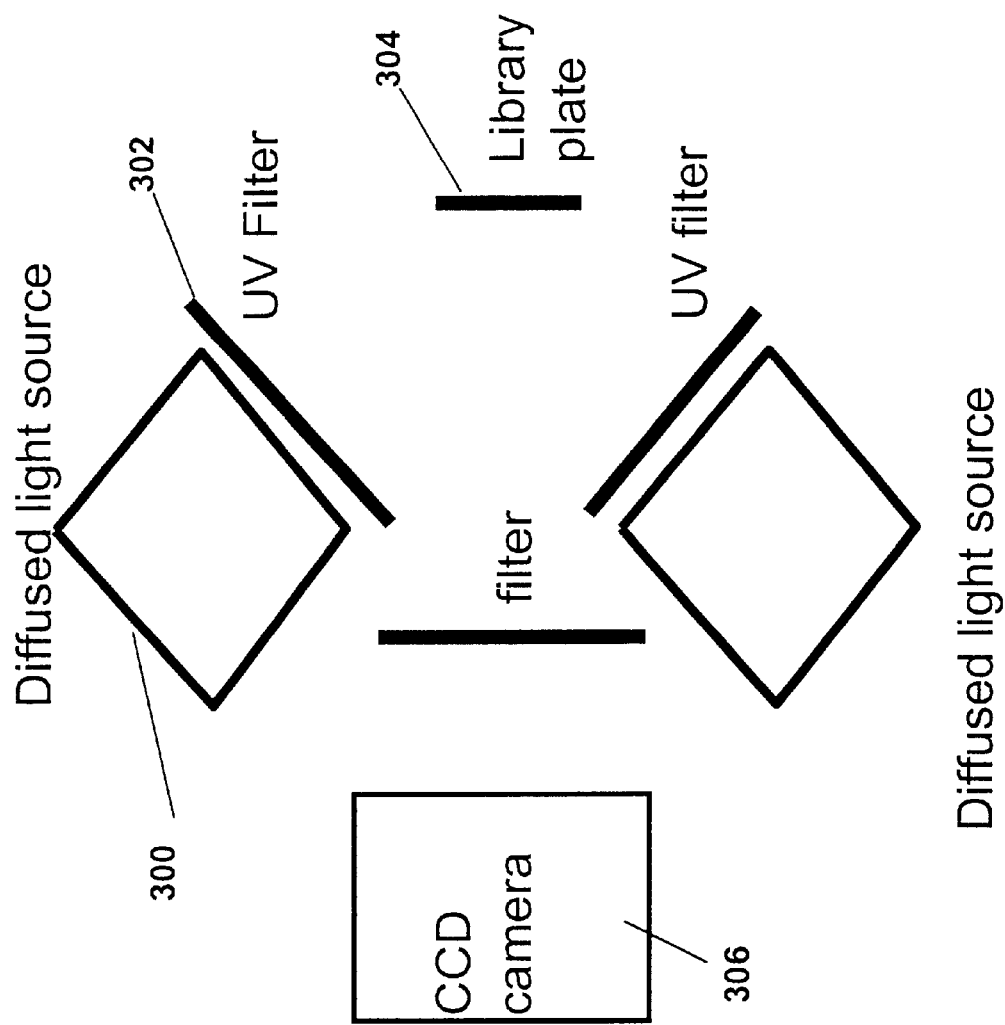
FIG. 3 is a schematic representation of a combi-phosphor fluorescent imaging system.

Referring to FIG. 3, for example, the combi-phosphor fluorescent imaging system quickly identifies a sample lead in a phosphor library. Here, the phosphor library 304 is illuminated with a uniform UV intensity field of 254 nm through a band pass filter 302 associated with a diffused light source 300, since fluorescent lamp phosphors have an excitation wavelength of 254 nm. A scientific grade charge coupling device (CCD) camera 306 is used to record the image of the library, such as the one shown in FIG. 6. The brightest phosphor of a given color is then selected from the digitized fluorescent image. The identified lead compositions may be used for further validation studies.

Figure 4:
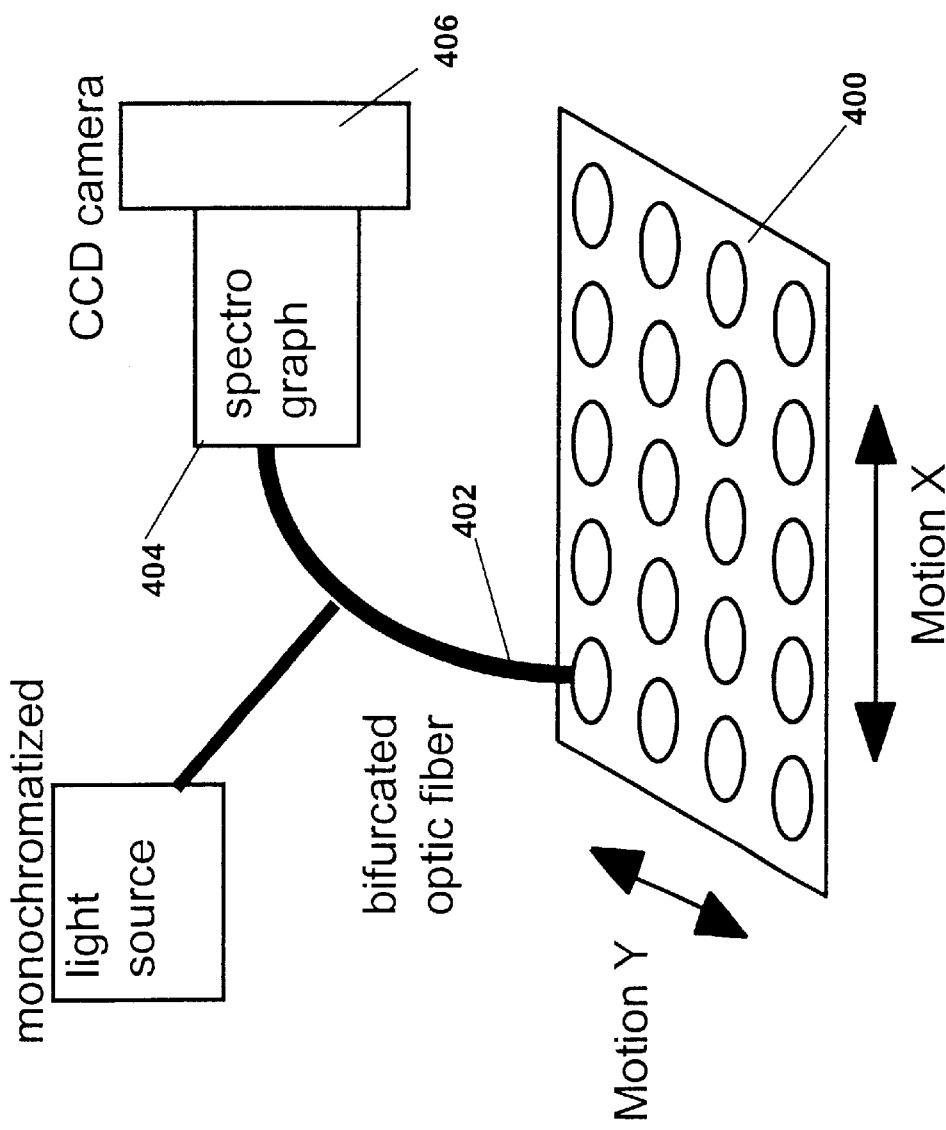
FIG. 4 is a schematic representation of fast serial fluorescent spectrum measurement system for phosphor library.

To further characterize phosphors in a library, a fast serial fluorescent spectrum measurement system as shown in FIG. 4 may be used to screen the emission spectrum of each phosphor in the library in a fast sequential mode. The library 400 is placed on a X-Y motion stage, and a bifurcated optical fiber 402 introduces excitation light (e.g. 254 nm) on a sample surface. The emitted fluorescent photon and reflected UV light is collected with the other branch of the bifurcated optical fiber 402 into a spectroscopy 404, using a cooled scientific grade CCD camera 406 as detector. This measurement system takes a fraction of a second to record an emission spectrum; and thus, it typically completes an emission spectrum measurement of a phosphor library plate in a few minutes.

The efficiency and throughput of the combinatory process described above, i.e., stream-lined combinatorial deposition, parallel synthesis, and screening, is enabled by the computer system according to the preferred embodiment of the present invention. Referring to FIG. 1, the computer system 100 includes a database module 102, which is connected to an analysis module 106, and one or more interface modules 104. Each interface module provides an interactive terminal for a user to control and monitor the combinatory synthesis and screening of the phosphor libraries, and to perform desired analytical studies on the data generated. The links among and between various modules in the system 100 may be direct network connections, connections over a wide-area network including a plurality of computers such as an enterprise intranet, or connections over an open network system such as the Internet between collaborators. In the case when open network connections are used, necessary security measures may be implemented, e.g., a virtual private network can be established.

The overall architecture of the system 100 may be primarily standalone in one embodiment, with one database supporting the combinatorial processes and the data analyses; in alternative embodiments, the system 100 may take a client-server configuration, with multiple clients serving multiple users, communicating with the server via a computer network. In the client-server environment, for example, a client may formulate instructions for library creation which are sent to the server which accordingly controls the library synthesis and screening process; the client may fashion queries according to the user's input and fire the queries against the database 102 which resides on the server's side, the server then sends back the results of the queries after processing, which may involve comprehensive analyses performed by the analysis module 106. A further alternative embodiment involves a client-server configuration where one or more client in the network maintains a mirror copy of the database 106; as such, the overall processing speed of the system may increase under certain circumstances. In this situation, the mirror copies of the database are periodically synchronized with the database on the server side, the master database, to ensure the integrity of both the data and the control of the system.

The hardware instrumentations, such as the liquid dispenser in FIG. 5, the combi-phosphor fluorescent imaging system in FIG. 3, and the fast serial fluorescent spectrum measurement system in FIG. 4 discussed supra, are linked to the computer system 100. Data generated are directly collected by the system 100, recorded in its database module 102. The photo-metric properties of interest, including quantum efficiency, UV absorption, color temperature, color coordinates, etc., may in turn be calculated from the recorded emission spectrum and reflected UV intensity values. The analysis module 106 of the computer system not only provides the basic computational capacities for calculating the photo-metric properties; it is also capable of performing statistical and other comprehensive data analyses on the attributes and characteristics of the phosphors.

Figure 2:
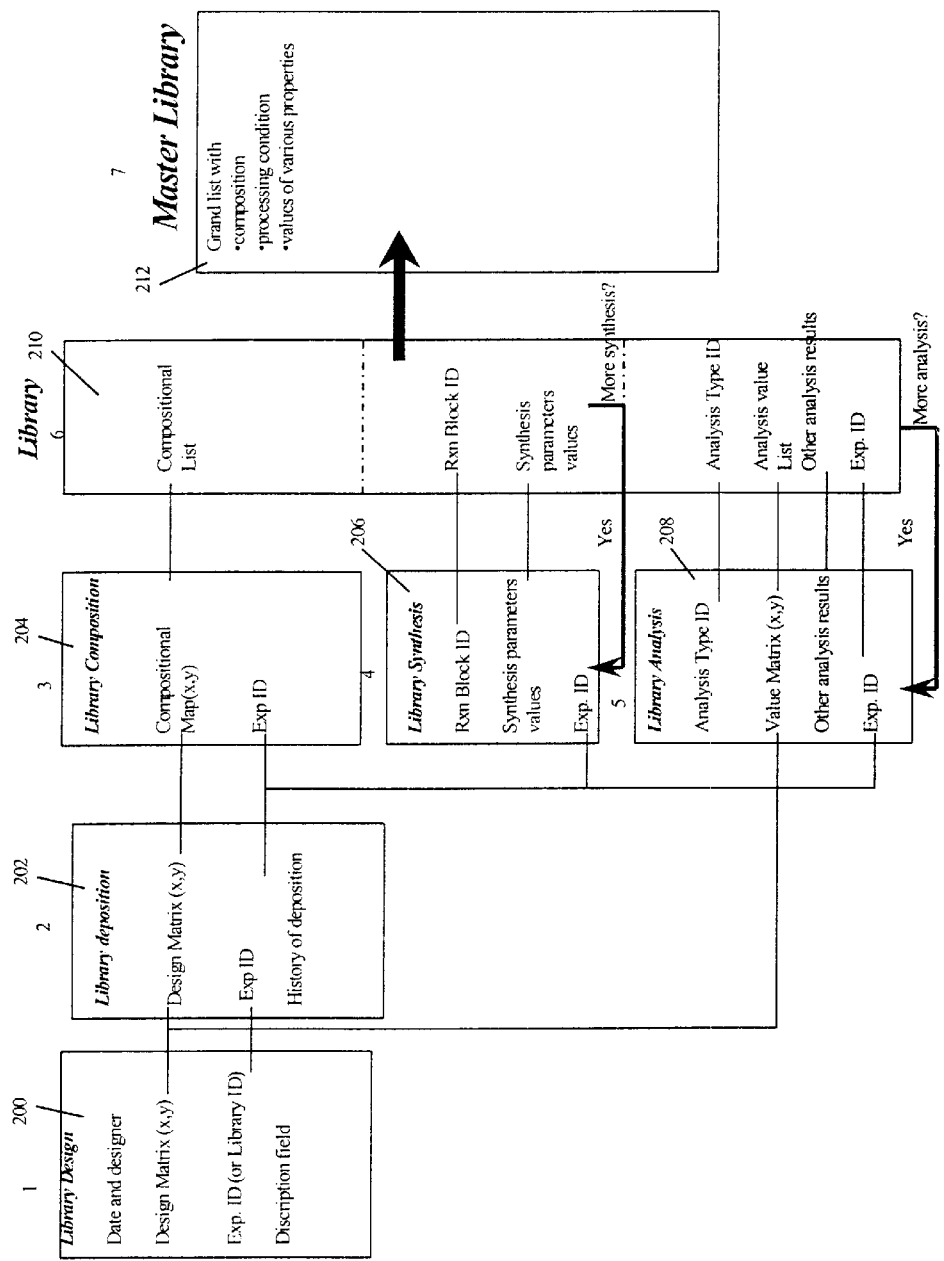
FIG. 2 is a flow chart of processing steps in the computer system 100 in one embodiment of this invention.

Paralleled to the combinatorial process of deposition, synthesis, and screening, the computer system performs distinct tasks at a number of different stages as shown in FIG. 2: the library design 200, the library deposition 202, the library composition 204, the library synthesis 206, and the library analysis 208. The library 210 and the master library 212 represent information deposits of the phosphors synthesized, where a particular chemical composition may be synthesized for multiple times under different conditions to generate sister libraries (210), which then may be combined to create the master library (212).

Figure 8:
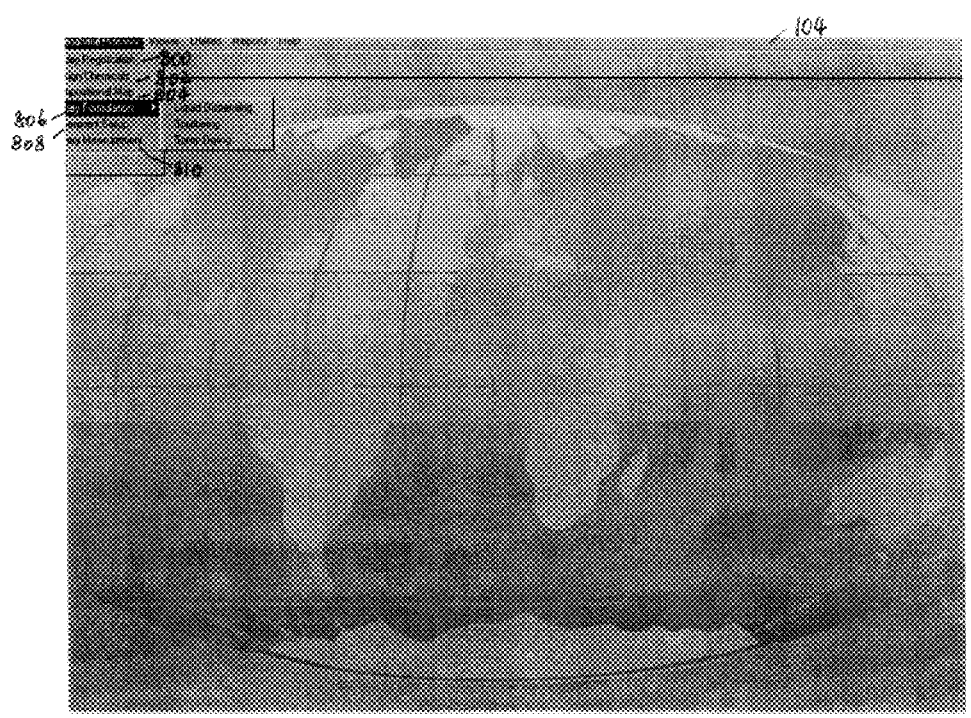
FIG. 8 is a screen shot of the interface 104, which displays a main menu of the system 100 in one embodiment of the system.

Various stages of this process are also reflected in FIG. 8, which is a screenshot representation of an example of a combinatory analysis computer system according to the preferred embodiment of the present invention. In this interface, the first menu item on the top menu bar is marked "combinatory process," which includes, in sequence, the items such as "library registration" (800), "design chemicals" (802), "compositional map" (804), "array formulation" (806), "experiment setup" (808), and "array measurement" (810). Here, "library registration" 800 corresponds with the library design 200 stage, where the user specifies/registers the general parameters of the library to be synthesized; "design chemicals" 802 corresponds with the library deposition 202 stage, where the registration of chemicals used is completed; "compositional map" 804 corresponds with the library composition 204 stage, where the composition of phosphor library is recorded; "array formulation" 806 and "experiment setup" 808 correspond with the library synthesis 206 stage, where the combinatory synthesis is performed based on the synthesis parameters specified; and "array measurement" 810 corresponds with the library analysis 208 stage, where comprehensive data analyses are carried out by the analysis module 106 of the computer system 100.

Figure 7:
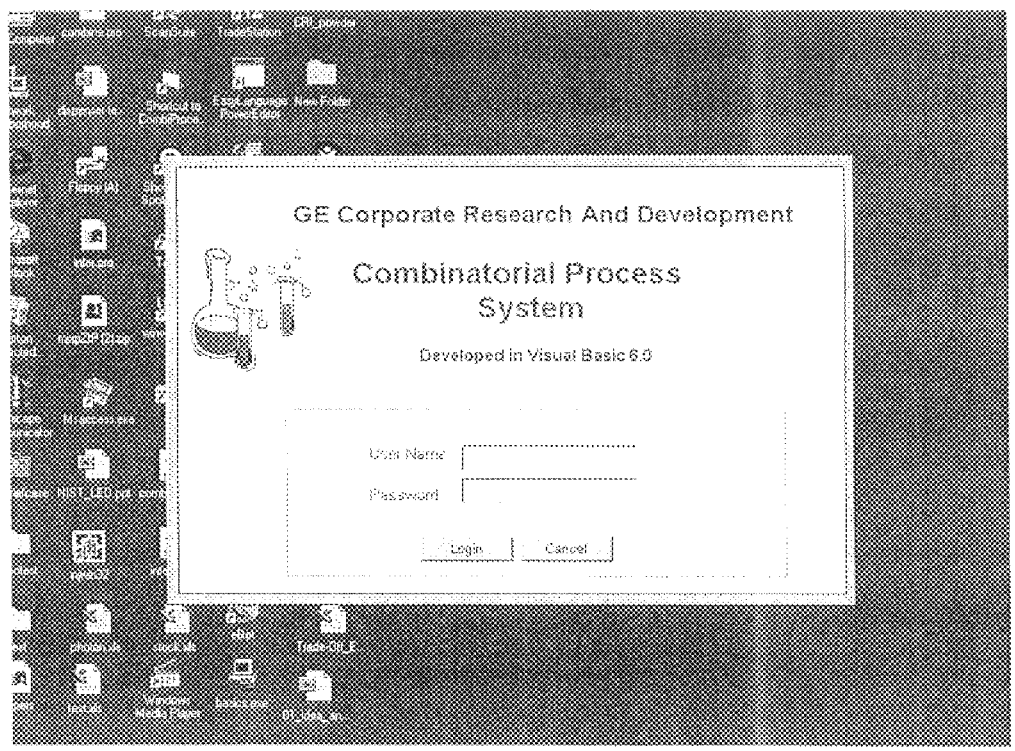
FIG. 7 is a screen shot of the interface 104 which prompts the user for a login name and password, according to one embodiment of this invention.

A user needs to register in advance and login the system to initialize the combinatory process. Access to the computer system 100 may be controlled by requiring a valid user name and password. As shown in FIG. 7, a user can type in the user name and password from a terminal, whether standalone having its own database and analysis modules, or networked to the server system which maintains the database and analysis modules.

Figure 9:
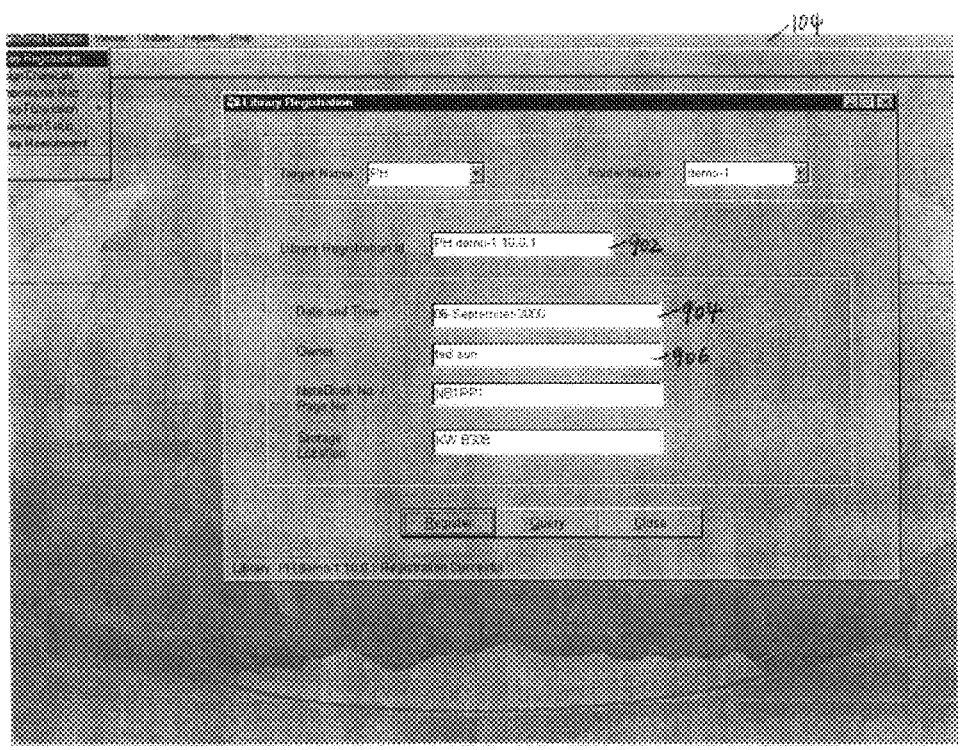
FIG. 9 is a screen shot of the interface 104, which demonstrates the registration process to establish a library.

At the library design 200 stage, the general information, including the date, designer, library ID, experiment ID, elemental precursors and properties of interest, etc. are entered by the user. Referring to FIG. 9, a dialog box 900 is presented to the user in the interface 104 of the computer system 100. A number of text fields are included in the dialog box 900, allowing the user to input the desired information. For example, the library identification number can be entered in the text field 902, the date and time can be entered in the text field 904, the designer information can be entered in the text field 906, etc. Also at the library design 200 stage, a composition matrix is defined according to the information input by the user, which corresponds to the array of samples in the phosphor library to be produced. The design parameters and the matrix information are recorded in the database; they may be either in a textual, tabular, or graphical format. The computer system 100 has visualization capacities; the compositions of phosphors may be rendered in various graphical representations, for example (see FIG. 15), to assist the user in viewing and analyzing the phosphor libraries of interest. Detailed discussion is included infra.

Figure 10:
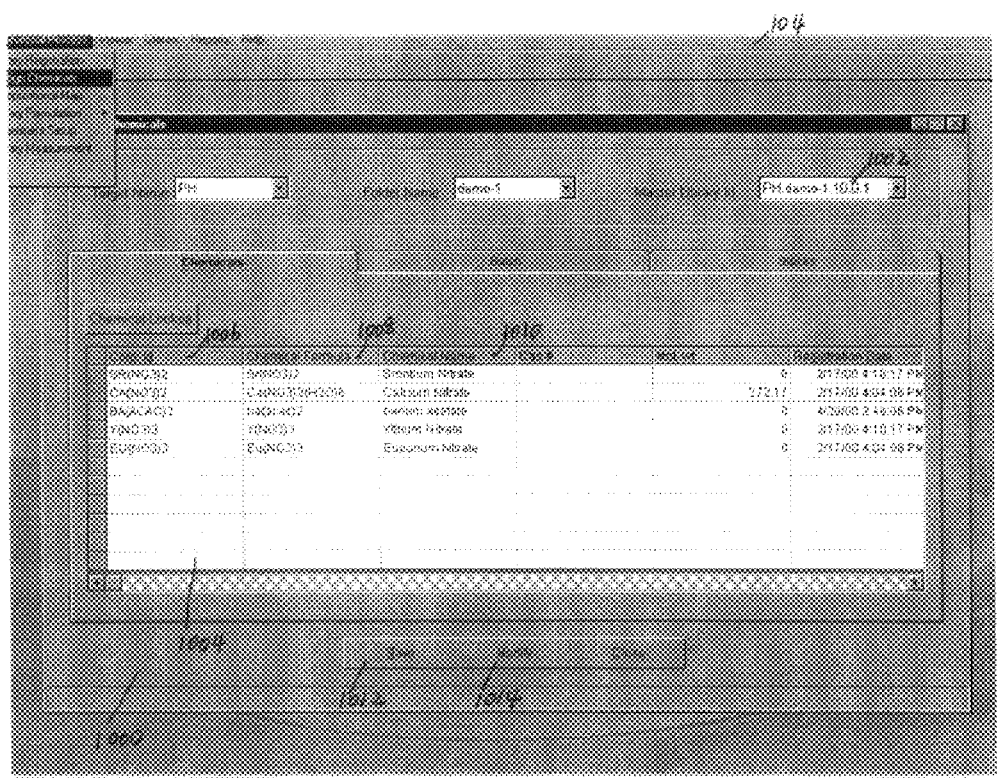
FIG. 10 is a screen shot of the interface 104, which shows that the user enters chemicals of interest for building the compound.

Once a library is registered, the composition matrix is imported to the library deposition 202 stage, where the deposition process of elemental precursors are recorded, including the sequence of deposition, the deposition quantity, and the pattern of deposition. Referring to FIG. 10, a dialog box 1000 is presented in the interface 104, which includes a number of specified text fields and a tabular window for the user to input the information desired. The library ID or experiment ID is passed from the library registration 200 stage, which is used here to track the libraries to be synthesized. The text field 1002 displays the library ID of this particular library. In the tabular window 1004, various elemental chemicals are entered by the user sequentially, according to the order of their deposition. Various columns of the table include additional information such as the name (1010) and formula (1008) of the chemical precursors, their assigned ID numbers (1006), and the amount to be used in the synthesis, etc. Such information is immediately imported into the database module 102 when the user press the "Save" button 1012; they may also be readily edited as necessary using the "Modify" button 1014.

Figure 11:
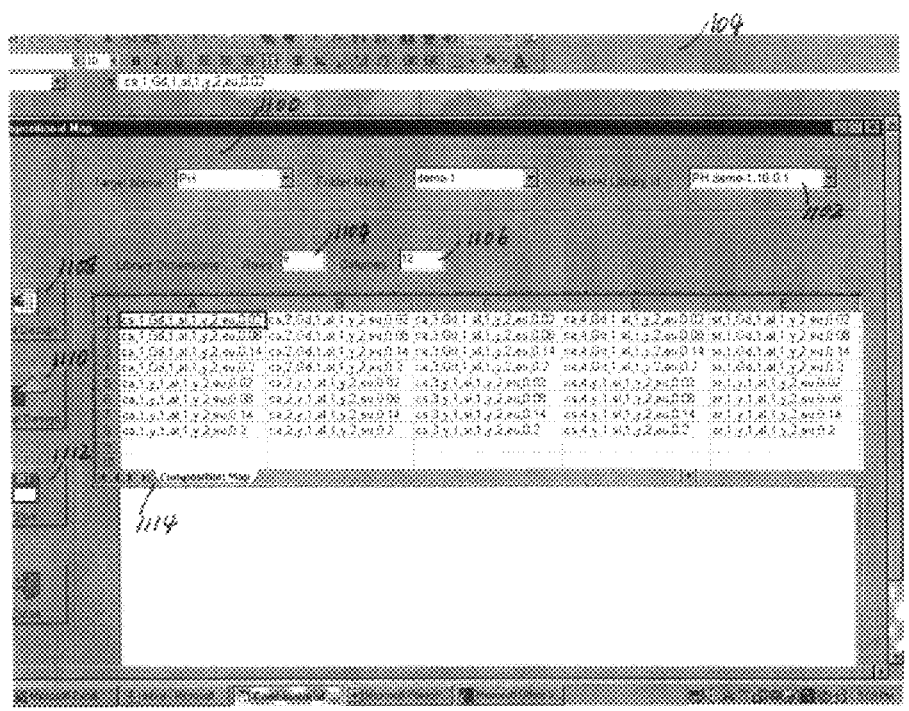
FIG. 11 is a screen shot of the interface 104, which shows a composition map of the library.

At the library composition 204 stage, the completed composition map is created, based on the composition matrix passed from the library deposition 202 stage. For example, a user may make a spreadsheet of the library composition using a ancillary macro process of the computer system in one embodiment, and import into the blank design matrix defined at the library design 200 stage which has the same dimension. Referring to FIG. 11, an example of a composition map is presented in the dialog box 1110 in the interface 104 of the computer system. The library identification number is shown in the text field Master Library ID 1102. The dimension of the composition map is determined by the number of rows entered in the text field 1104 and the number of columns entered in the text field 1106. The tabular winder 1114 displays the content of the composition map, which essentially contain an array of elemental compositions in a table. The user may use the MS Excel-like format to create and import the table or spreadsheet by pressing the button Excel Design 1108. This functionality is implemented in Visual Basic in one embodiment of this invention, to ensure the compatibility with the typical MS desktop applications as a matter of practical convenience. The user may create the composition map using other procedures and graphical tools; the Visual Design button 1110 provides such alternatives, for example. The composition of each sample in the library as recorded in the map will be normalized by the system to represent the mole ratio of the each element in a given sample. After creating and editing the map, the user may import such compositional information into the database 102 by clicking the Save button 1112.

Figure 12:
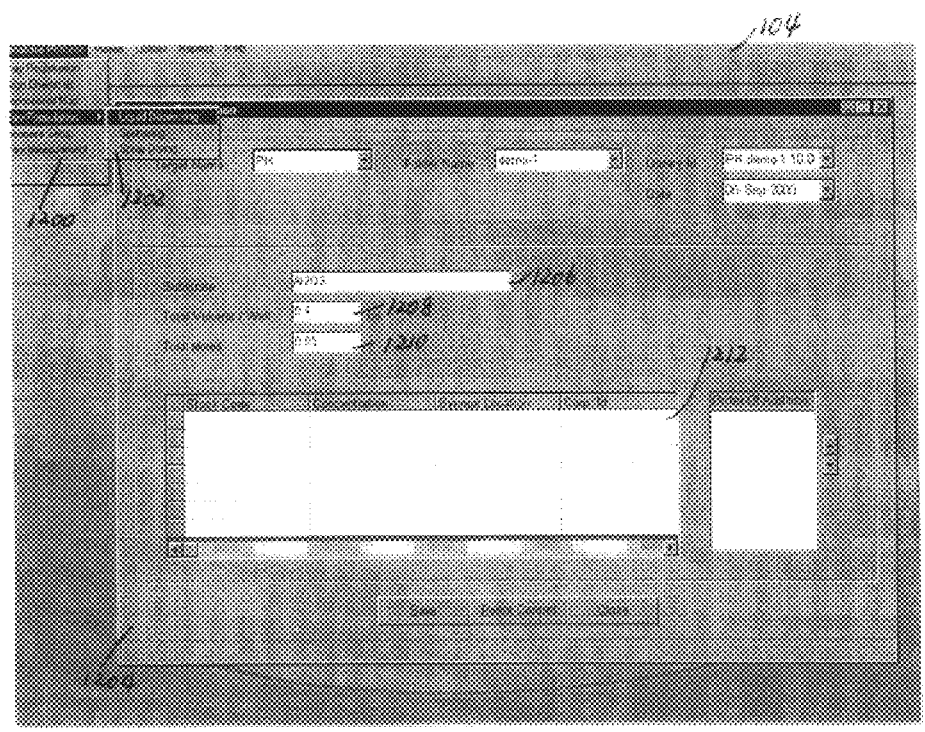
FIG. 12 is a screen short of the interface 104, demonstrating that the user chooses different methods for combinatory deposition and synthesis of the library.

After the library composition is determined, the system proceeds with the library synthesis, i.e., the library synthesis 206 stage. At this stage, the method of synthesis and the processing condition of the library are entered. Referring to FIG. 12, in the interface 104, clicking on the first menu item "Combinatory Process" allows the user to bring up a dropdown list (1200) of items and procedures, including "Library Registration," "Design Chemicals," "Composition Map," etc. as discussed supra. When highlighting "Array Formulation," the user will see another dropdown list (1202) of different methods of deposition or synthesis, including "Liquid Dispensing," "Sputtering," and "Spray Drying," for example. The user may choose a specific procedure based on his specific needs and availability of hardware instrumentation. For example, if the user uses a liquid dispensing method, a corresponding dialog box 1204 will pop up requesting relevant information for carrying out this method. The user then enters substrate in the text field 1206, total volume per well in the text field 1208, and total mole amount in the text field 1210. Additional information such as syringe location, concentration of the chemical dispensed, etc., may be input in the tabular window 1212 as needed. These user's inputs are recorded in the database 102 of the system 100, which forward the synthesis instruction to the connected hardware instrument. For example, a robot is driven by the system to generate a compositional phosphor library as desired.

Figure 13:
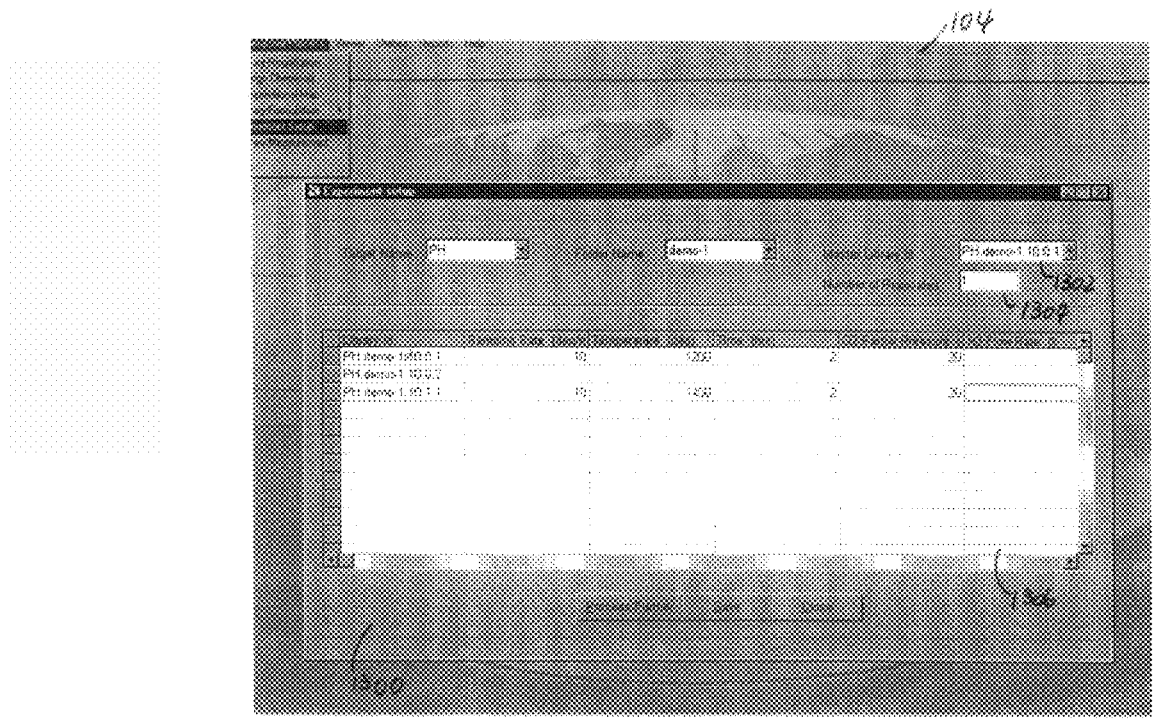
FIG. 13 is a screen shot of the interface 104, demonstrating that the user specifies thermal processing conditions for making the phosphor library.

Once generated, the phosphor libraries need to be thermally processed to make the final library products. Referring to FIG. 13, a dialog box 1300 is displayed when the user chooses "Experiment Setup" from the dropdown list of the first menu item "Combinatory Process." Here, the processing condition are specified in the tabular window 1306, including temperature, rate of temperature increase, time, atmosphere species, pressure, and flow rate of $O_2$ or $H_2$, to name a few. It is noted that one or more libraries may be processed using the same composition. In the case when the user select to process further, multiple libraries will be made, and different processing conditions will be adopted. The identical composition libraries created as such will each be automatically assigned a reaction block identification number corresponding to each processing condition. These libraries may be combined to make a master library and share the same master library identification number; the text field 1302 displays such master library ID. The number of replicates in a master library is shown in the text field 1304.

Figure 14:
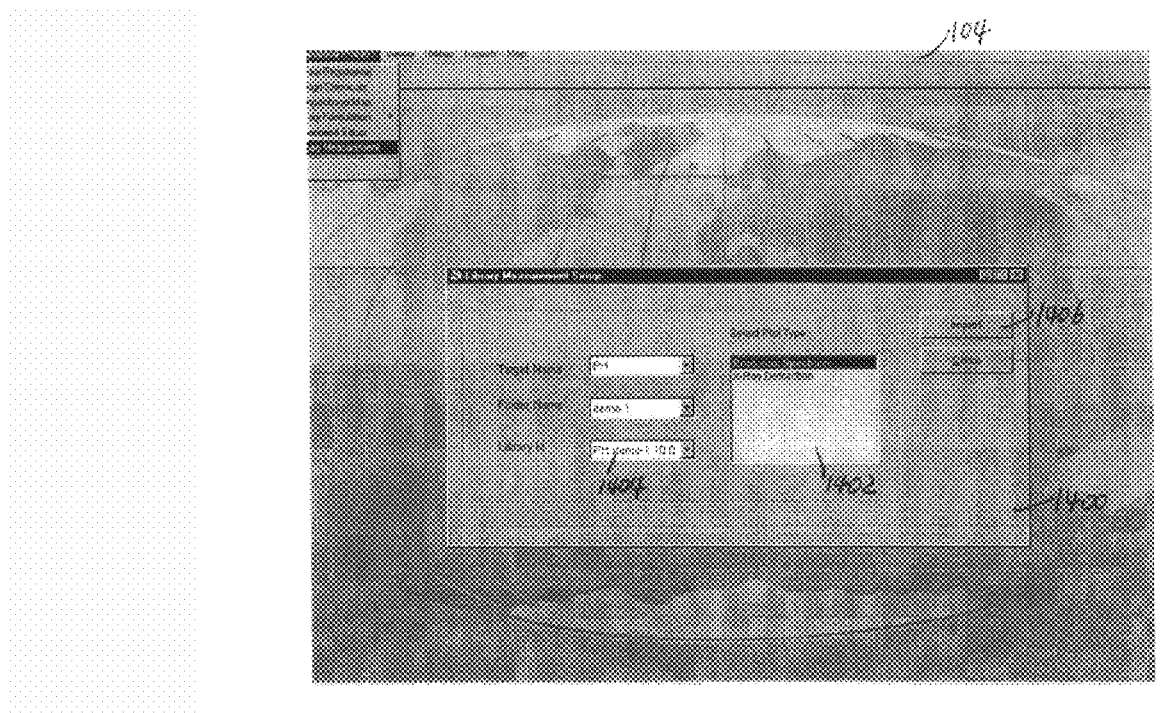
FIG. 14 is a screen shot of the interface 104, showing that different measurements, e.g., emission spectrum and X-ray diffraction graph may be recorded into the database 102, as designated by the user.

After the phosphor libraries are made, the computer system 100 is ready for the analyses the user wishes to run. The initial step of the library analysis 208 stage is the appropriate measurement of the phosphor libraries made. Referring to FIG. 14, the user will see a popup dialog box Library Measurement Setup (1400) when selecting "Array Measurement" from the dropdown list of "Combinatory Process," the first menu item on the main menu of the interface 104. Here, the user may choose emission spectrum and/or X-ray defraction from the window 1402, for example. In emission spectrum, the intensity is recorded as the function of the wavelength value, whereas in X-ray diffraction, the intensity is plotted against the diffraction angle values. Each sample in the phosphor library will have a set of emission spectrum as well as X-ray diffraction in the preferred embodiment of this invention. The library identification number is displayed in the text field 1404. When ready, the user may press the Import button 1406 to import the measurement selection to the database module 102.

The computer system 100 subsequently sends the instruction to the hardware instrumentation connected, such as a fluorescent spectrum measurement system. The result of the measurement may be recorded in the tabular format, according to the dimension and arrangement of the array of the composition map, given a certain library and a reaction identification number. The recorded data in a table or spreadsheet may be imported as a whole into the defined design matrix, corresponding to the matrix of the composition map, in one embodiment of this invention. In alternative embodiments, the measurement result may be directly imported to the matrix in the database as each measurement is obtained. The computer system provides such flexibility so that the user may choose from on-line and off-line operations under different circumstances. Further, the computer system also supports other data format; for example, the images of luminescence of phosphor library at various excitation wave lengths may be imported into the database. In one embodiment, ActiveX control is used to extend such capacity to the database 102 of the computer system 100.

Figure 15:
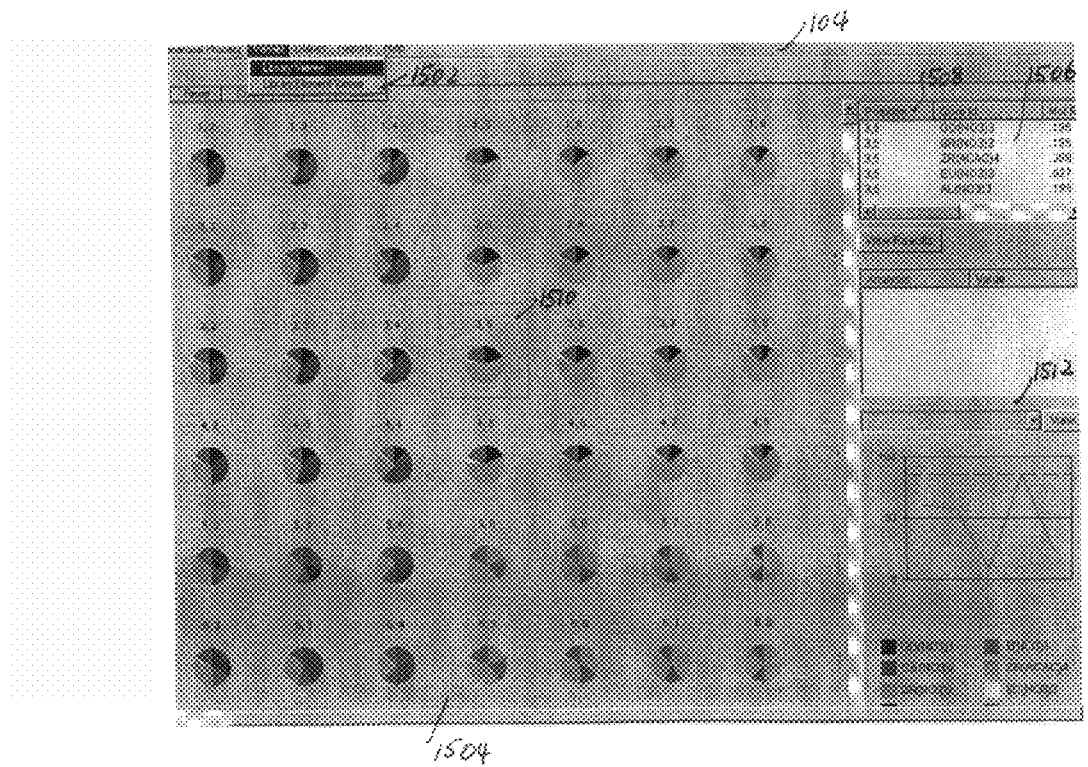
FIG. 15 is a screen shot of the interface 104, showing a particular visualization on elemental compositions of each sample in phosphor library.

Various types of analyses may be incorporated into the computer system, including direct calculation as well as sophisticated data correlation and reference or pattern recognition analyses. Visualization capacities are provided to facilitate analyses for certain attributes of the phosphors. The system 100 update and extend the available analyses in its analysis module 106 for new properties of interest. Referring to FIG. 15, selecting "Library Viewer" from the dropdown list 1502 of the second item "Viewer" on the main menu of the interface 104, the user is presented with an example of the library composition visualized as pie charts 1504. The mole fraction of each element is plotted in the pie chart for every sample; the different elements are color coded in the pie. The chemical composition of a selected sample is displayed in the window 1506. For example, selecting the sample pie chart 1510 in the middle of the charts, the user will see its composition in the window 1506. The field 1508 displays the internal index of this sample, locating its position (3, 5) in the phosphor library being studied. Results of a specified analysis may be displayed in the window 1512.

Figure 16:
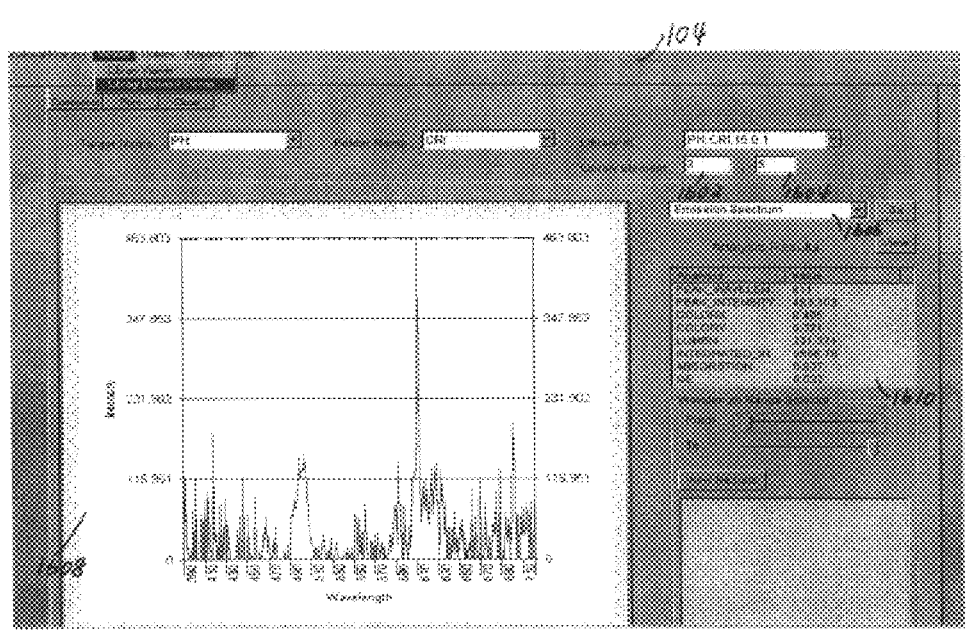
FIG. 16 is a screen shot of the interface 104, showing the emission spectrum of a phosphor sample in phosphor library.

Another example of the analysis performed by the analysis module 106 is illustrated in FIG. 16, which demonstrates a Library Element Viewer in the interface 104. The user may input the index or position of a library element or sample in the text fields 1602 and 1604, and select the type of analysis from the predefined list in the field 1606. When "Emission Spectrum" is selected, the plot of intensity against wavelength is given in the window 1608, with the characteristic features of the spectrum displayed in the window 1610. The latter are derived from the processing of the analysis module 106. When the user chooses to study other photo-metric properties from the field 1606, such as color coordinates, absorption, quantum efficiency, lumen efficiency, etc, the 106 module performs the corresponding computation and the results will be displayed in the same viewer.

It is noted that the system of the preferred embodiments of the invention also provides flexibility to readily adopt or incorporate external statistical data analysis or visualization packages such as those available commercially, e.g., SPOT-FIRE™. Cross referencing to the core analysis results may be presented in the same interface 104 under this situation.

As discussed above, the library 210 and the master library 212 stages represent the deposit of all information relating to the phosphor libraries created. The computer system maintains its database module 102 which contains the library and master library information. There are grand lists of composition of elements, processing conditions, and values of different properties, for example. The system of the preferred embodiments of the present invention not only serves as an information storage, it also operates as the driver for combinatorial synthesis, and the engine for data analysis and querying. The system supports searches based on a certain range of elemental compositions, e.g., according to the alphabetic order; it provides sorting feature on various numeric attributes; it analyzes and displays multiple dimensional relationships in a graphical pattern; it allows horizontal correlation studies based on elemental composition, library processing, and phosphor properties. Used in an iterative process in combinatorial discovery of advanced lighting phosphors, the system also allows the user to map out the compositional areas of high property promise, hence provides guidance for designing the subsequent library to be made.

In summary, the integration of the combinatorial hardware instrumentation with the database and analysis modules as provided by the computer system and method according to the preferred embodiments of the present invention increases the efficiency and speed of the combinatorial synthesis and screening process for identifying desired luminescent materials. Several orders of magnitudes improvement on the speed may be achieved.

The preferred embodiments have been set forth herein for the purpose of illustration. However, this description should not be deemed to be a limitation on the scope of the invention. Accordingly, various modifications, adaptations, and alternatives may occur to one skilled in the art without departing from the spirit and scope of the claimed inventive concept.

I claim:

1. A system for high-throughput combinatorial synthesis, screening and analysis of lighting phosphors, comprising:
   a computer system for recording, sorting and organizing photo-metric data related to the lighting phosphors;
   a database disposed within the computer system comprising data related to properties of the lighting phosphors;
   an analysis module operable for combinatorial analyses of the lighting phosphor properties; and
   an interface operable for inputting instructions to the computer system and presenting information to a user;
   wherein the computer system, the database, the analysis module, and the interface are interconnected.

2. The system of claim 1, further comprising one or more said interfaces, each of which is connected to said database via a computer network.

3. The system of claim 1, further comprising a first plurality of said databases and a second plurality of said interfaces, wherein one database in said first plurality is connected to one interface in said second plurality via a computer network.

4. The system of claim 1, wherein said database is connected to a synthesizer capable of depositing compositional elements, and synthesizing combinatory libraries of said lighting phosphors.

5. The system of claim 1, wherein said database is connected to a detector capable of measuring photo-metric properties of said lighting phosphors, and screening for desired lighting phosphors having prescribed photo-metric properties.

6. A method for combinatorial synthesis, screening, and analysis of lighting phosphors, comprising:

obtaining a first combinatory library of the-lighting phosphors;

digitally recording properties of said lighting phosphors in said first combinatory library; and performing computerized analyses based on said properties and the information relating to said combinatorial synthesis and screening;

wherein the obtaining, the digitally recording, and the performing computerized analyses are performed using a computer system for recording, sorting and organizing photo-metric data related to the lighting phosphors, a database comprising data related to properties of the lighting phosphors, an analysis module operable for combinatorial analyses of the lighting phosphors and an interface operable for inputting instructions to the computer system and presenting information to a user.

7. The method of claim 6, wherein said obtaining is further controlled by a computerized system which accepts instructions from a user.

8. The method of claim 6, further comprising obtaining one or more additional combinatory libraries of lighting phosphors; and digitally recording properties of said lighting phosphors in said one or more additional combinatory libraries, wherein said one or more additional combinatory libraries share the same composition as said first combinatory library.

9. The method of claim 6, further comprising obtaining one or more additional combinatory libraries of lighting phosphors; and digitally recording properties of said lighting phosphors in said one or more additional combinatory libraries, wherein said one or more additional combinatory libraries have at least one composition which differs from that of said first combinatory library.

10. A system for combinatorial synthesis, screening, and analysis of lighting phosphors, comprising:

a computer means operable for recording, sorting and organizing photo-metric data related to the lighting phosphors;

a database means for recording information relating to said synthesis, said screening, said analysis, and results of said analysis;

an analysis means for performing analytic operations to derive said results; and an interface means for allowing a user to input instructions to said computer system and the computer system to present said information to the user;

wherein said computer means, said database means, said analysis means, and said interface means are interconnected.

* * * * *